United States Patent
Park et al.

(10) Patent No.: US 9,544,803 B2
(45) Date of Patent: Jan. 10, 2017

(54) METHOD FOR REPORTING CHANNEL STATE INFORMATION IN A WIRELESS COMMUNICATION SYSTEM, AND APPARATUS THEREFOR

(75) Inventors: Sungho Park, Anyang-si (KR); Jinyoung Chun, Anyang-si (KR); Kitae Kim, Anyang-si (KR); Sunam Kim, Anyang-si (KR); Jiwon Kang, Anyang-si (KR); Binchul Ihm, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 243 days.

(21) Appl. No.: 14/112,899

(22) PCT Filed: Apr. 20, 2012

(86) PCT No.: PCT/KR2012/003040
§ 371 (c)(1),
(2), (4) Date: Nov. 21, 2013

(87) PCT Pub. No.: WO2012/144842
PCT Pub. Date: Oct. 26, 2012

(65) Prior Publication Data
US 2014/0071848 A1 Mar. 13, 2014

Related U.S. Application Data

(60) Provisional application No. 61/477,583, filed on Apr. 20, 2011.

(51) Int. Cl.
*H04W 24/10* (2009.01)
*H04L 5/00* (2006.01)
*H04L 25/03* (2006.01)

(52) U.S. Cl.
CPC ............ *H04W 24/10* (2013.01); *H04L 5/0057* (2013.01); *H04L 5/0073* (2013.01); *H04L 5/0023* (2013.01);
(Continued)

(58) Field of Classification Search
None
See application file for complete search history.

(56) References Cited

U.S. PATENT DOCUMENTS

2009/0190528 A1* 7/2009 Chung ................. H04B 7/0417
370/328
2010/0234037 A1 9/2010 Terry et al.
(Continued)

FOREIGN PATENT DOCUMENTS

| KR | 10-2010-0098728 | 9/2010 |
| WO | 2010/144729 | 12/2010 |
| WO | 2011/021830 | 2/2011 |

OTHER PUBLICATIONS

Samsung, "Periodic CSI reporting configuration and collision handling for two subsets", 3GPP TSG-RAN WG1 meeting #63bis, R1-110096, XP0504900065, Jan. 2011, pp. 1-3.*

(Continued)

*Primary Examiner* — Jamal Javaid
*Assistant Examiner* — George Atkins, Jr.
(74) *Attorney, Agent, or Firm* — Lee Hong Degerman Kang & Waimey

(57) ABSTRACT

The present invention relates to a wireless communication system. More particularly, the present invention relates to a method and apparatus for reporting channel state information (CSI), wherein the method in which a terminal reports CSI comprises the steps of: receiving configuration information for periodic CSI reporting from a base station; and transmitting CSI information for each of a plurality of sets
(Continued)

of CSI reports based on said configuration information to said base station via a physical uplink control channel (PUCCH). Said plurality of sets of CSI reports contains one or more mutually different subframes.

8 Claims, 9 Drawing Sheets

(52) U.S. Cl.
CPC ............ *H04L 5/0046* (2013.01); *H04L 5/0048* (2013.01); *H04L 5/0053* (2013.01); *H04L 25/03891* (2013.01)

(56) References Cited

U.S. PATENT DOCUMENTS

| | | | | |
|---|---|---|---|---|
| 2011/0243012 | A1* | 10/2011 | Luo | H04L 5/0055 370/252 |
| 2011/0274188 | A1* | 11/2011 | Sayana | H04B 7/0639 375/260 |
| 2012/0076089 | A1* | 3/2012 | Kawamura | H04L 1/0031 370/329 |
| 2012/0201154 | A1* | 8/2012 | Chandrasekhar | H04W 24/10 370/252 |

OTHER PUBLICATIONS

Huawei et al., "Open issues for aperiodic and periodic CSI reporting", 3GPP TSG RAN WG1 meeting #63bis, R1-110021, XP050490004, Jan. 2011, p. 3.*
Samsung, "Periodic CSI reporting configuration and collision handling for two subsets", #GPP TSG RAN WG1 meeting #63bis, R1-110096, XP05490065, Jan. 2011, 4 pages.*
Huawei, et al., "Open issues for aperiodic and periodic CSI reporting," 3GPP TSG RAN WG1 meeting #63bis, R1-110021, XP050490004, Jan. 2011, 4 pages.
Samsung, "Periodic CSI reporting configuration and collision handling for two subsets," 3GPP TSG RAN WG1 meeting #63bis, R1-110096, XP050490065, Jan. 2011, 4 pages.
MediaTek Inc., "Collision Handling for Periodic CSI Reporting in Subframe Subsets," 3GPP TSG-RAN WG1 #63bis, R1-110142, XP050490315, Jan. 2011, 4 pages.
European Patent Office Application Serial No. 12774270.8, Search Report dated Sep. 22, 2014, 7 pages.
PCT International Application No. PCT/KR2012/003040, Written Opinion of the International Searching Authority dated Nov. 9, 2012, 17 pages.

* cited by examiner

PUCCH Format 2, 2a and 2b Structure (Normal CP case)

PUCCH Format 2, 2a and 2b Structure ( Extend CP case)

| CQI reporting mode | | PMI feedback type | |
|---|---|---|---|
| | | No PMI | Single PMI |
| PUCCH CQI feedback type | Wideband (wideband CQI) | Mode 1-0 | Mode 1-1 |
| | UE-selected (subband CQI) | Mode 2-0 | Mode 2-1 |

METHOD FOR REPORTING CHANNEL STATE INFORMATION IN A WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2012/003040, filed on Apr. 20, 2012, which claims the benefit of U.S. Provisional Application Ser. No. 61/477,583, filed on Apr. 20, 2011, the contents of which are hereby incorporated by reference herein in their entirety.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

DISCLOSURE OF THE INVENTION

Technical Tasks

One object of the present invention is to provide a method of efficiently transmitting control information in a wireless communication system and apparatus therefor. Another object of the present invention is to provide a channel format for transmitting control information efficiently, a signal processing for the same, and an apparatus therefor. A further object of the present invention is to provide a method of efficiently allocating a resource for transmitting control information and apparatus therefor.

Technical tasks obtainable from the present invention are non-limited by the above-mentioned technical tasks. And, other unmentioned technical tasks can be clearly understood from the following description by those having ordinary skill in the technical field to which the present invention pertains.

Technical Solutions

To achieve these and other advantages and in accordance with the purpose of the present invention, as embodied and broadly described, a method of reporting a channel state information (CSI), which is performed by a user equipment in a wireless communication system, according to one embodiment of the present invention includes the steps of receiving a configuration information for a periodic reporting of CSI from a base station and transmitting a CSI information on each of a plurality of CSI report sets according to the configuration information to the base station on PUCCH (physical uplink control channel), wherein a plurality of the CSI report sets include one or more different subframes.

To further achieve these and other advantages and in accordance with the purpose of the present invention, as embodied and broadly described, a method of receiving a channel state information (CSI), which is performed by a base station in a wireless communication system, according to another embodiment of the present invention includes the steps of transmitting a plurality of configuration informations for a periodic reporting of CSI to a user equipment and receiving a CSI information on each of a plurality of CSI report sets according to the configuration information from the user equipment on PUCCH (physical uplink control channel), wherein a plurality of the CSI report sets include one or more different subframes.

To further achieve these and other advantages and in accordance with the purpose of the present invention, as embodied and broadly described, a user equipment, which is configured to perform a channel state information (CSI) reporting in a wireless communication system, according to another embodiment of the present invention includes a radio frequency (RF) unit and a processor configured to control the radio frequency unit to receive a configuration information for a periodic reporting of the CSI from a base station, the processor configured to control the radio frequency unit to transmit a CSI information on each of a plurality of CSI report sets according to the configuration information to the base station on PUCCH (physical uplink control channel), wherein a plurality of the CSI report sets include one or more different subframes.

To further achieve these and other advantages and in accordance with the purpose of the present invention, as embodied and broadly described, a base station, which is configured to receive a channel state information (CSI) in a wireless communication system, according to a further embodiment of the present invention includes a radio frequency (RF) unit and a processor configured to control the radio frequency unit to transmit a plurality of configuration informations for a periodic reporting of the CSI to a user equipment, the processor configured to control the radio frequency unit to receive a CSI information on each of a plurality of CSI report sets according to the configuration information from the user equipment on PUCCH (physical uplink control channel), wherein a plurality of the CSI report sets include at least one or more different subframes.

Preferably, coding for transmitting the CSI information on each of a plurality of the CSI report sets to the base station follows a joint coding scheme of coding the CSI informations into prescribed transmission bits by synthesizing the CSI informations together.

Preferably, coding for transmitting the CSI information on each of a plurality of the CSI report sets to the base station is performed in a manner of synthesizing the CSI informations by coding the CSI informations into the same predetermined bits and then coding the synthesized CSI information into prescribed transmission bits.

Preferably, a plurality of the CSI report sets include a restricted subset including subframes respectively having different inter-cell interferences.

Advantageous Effects

According to the present invention, a control information can be efficiently transmitted in a wireless communication system. And, a channel format for transmitting a control information efficiently and a signal processing method can be provided. Moreover, a resource for a control information transmission can be efficiently allocated.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE FOR INVENTION

First of all, techniques explained in the following description may be applicable to various kinds of wireless access systems. For example, the access system may include one of CDMA (code division multiple access), FDMA (frequency division multiple access), TDMA (time division multiple access), OFDMA (orthogonal frequency division multiple access), SC-FDMA (single carrier frequency division multiple access) and the like. CDMA may be implemented by such a wireless or radio technology as UTRA (universal terrestrial radio access), CDMA 2000 and the like. TDMA may be implemented with such a wireless technology as GSM (Global System for Mobile communications), GPRS (General Packet Radio Service), EDGE (Enhanced Data Rates for GSM Evolution) and the like. OFDMA may be implemented with such a wireless technology as IEEE (Institute of Electrical and Electronics Engineers) 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (DL) and SC-FDMA in uplink (UL). And, LTE-A (LTE-Advanced) is an evolved version of 3GPP LTE. For clarity, the following description mainly concerns a case of 3GPP LTE/LTE-A, by which the technical features of the present invention may be non-limited.

In a wireless communication system, a user equipment receives information in downlink (hereinafter abbreviated DL) from a base station and transmits information in uplink (hereinafter abbreviated UL) to the base station. Informations transceived between the base station and the user equipment may include data and various kinds of control informations. And, there are various kinds of physical channels depending on types/usages of the informations transceived between the user equipment and the base station.

Figure 1:
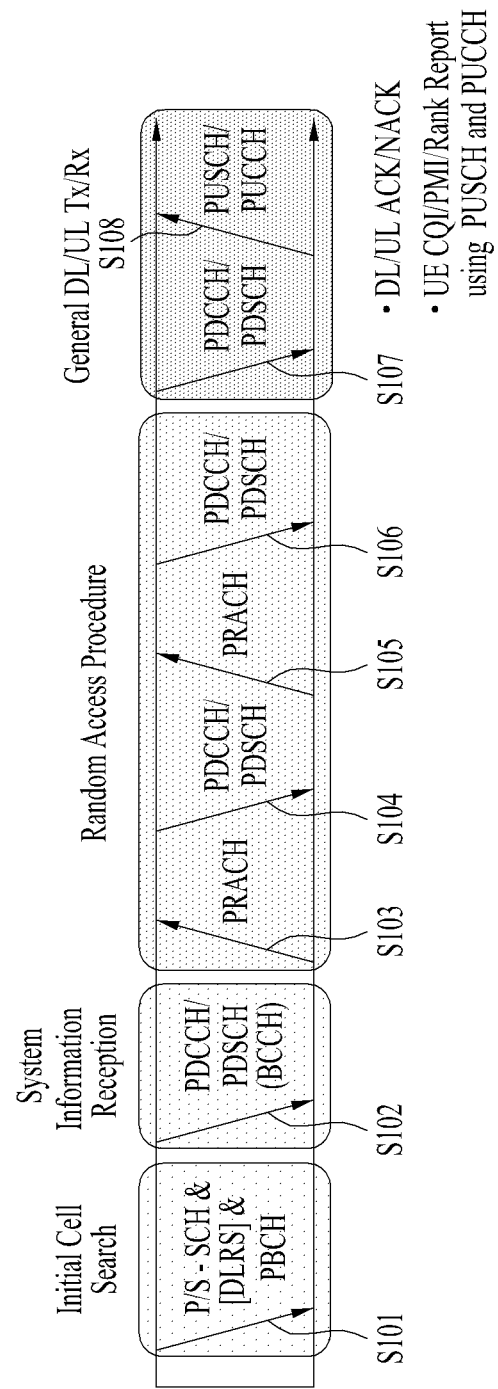
FIG. 1 illustrates a diagram for one example to describe physical channels used for 3GPP LTE system and a signal transmitting method using the same.

FIG. 1 is a diagram to describe physical channels used for 3GPP LTE system and a signal transmission using the same.

If a power of a user equipment in power-off state is turned on again or the user equipment enters a new cell, the user equipment may perform an initial cell search job for matching synchronization with a base station and the like [S101]. To this end, the user equipment may receive a primary synchronization channel (P-SCH) and a secondary synchronization channel (S-SCH) from the base station, may match synchronization with the base station and may then obtain information such as a cell ID and the like. Subsequently, the user equipment may receive a physical broadcast channel from the base station and may then obtain intra-cell broadcast information. Meanwhile, in the initial cell search step, the user equipment receives a downlink reference signal (DL RS) and is then able to check a DL channel state.

Having completed the initial cell search, the user equipment may receive a physical downlink control channel (PDCCH) and a physical downlink shared channel (PDSCH) according to the physical downlink control channel (PDCCH) and may be then able to obtain a detailed system information [S102].

Thereafter, in order to complete an access to the base station, the user equipment may perform a random access procedure on the base station [S103 to S016]. To this end, the user equipment may transmit a preamble on a physical random access channel (PRACH) [S103] and may then receive a response message via a physical downlink control channel (PDCCH) and a corresponding physical downlink share channel in response to the preamble [S104]. In case of a contention based random access, the user equipment can perform a contention resolution procedure such as a transmission S105 of an additional physical random access channel signal and a channel reception S106 of a physical downlink control channel signal and a corresponding physical downlink shared channel signal.

Having performed the above mentioned steps, the user equipment can perform a reception S107 of a physical downlink control channel signal and/or a physical downlink shared channel signal and a transmission S108 of a PUSCH (physical uplink shared channel) signal and/or a PUCCH (physical uplink control channel) signal S108 as a general uplink/downlink signal transmitting procedure. A control information transmitted by a user equipment to a base station is generally called an uplink control information (UCI). The UCI may include information on HARQ-ACK/NACK (Hybrid Automatic Repeat and reQuest Acknowledgement/Negative-ACK), SR (Scheduling Request), CQI (Channel Quality Indication), PMI (Precoding Matrix Indication), RI (Rank Indication) and the like. Although UCI is generally transmitted on PUCCH by periods in LTE system, in case that both control information and traffic data should be transmitted simultaneously, the UCI may be transmitted on PUSCH. Moreover, the UCI may be aperiodically transmitted on PUSCH in response to a request/instruction made by a network.

Figure 2:
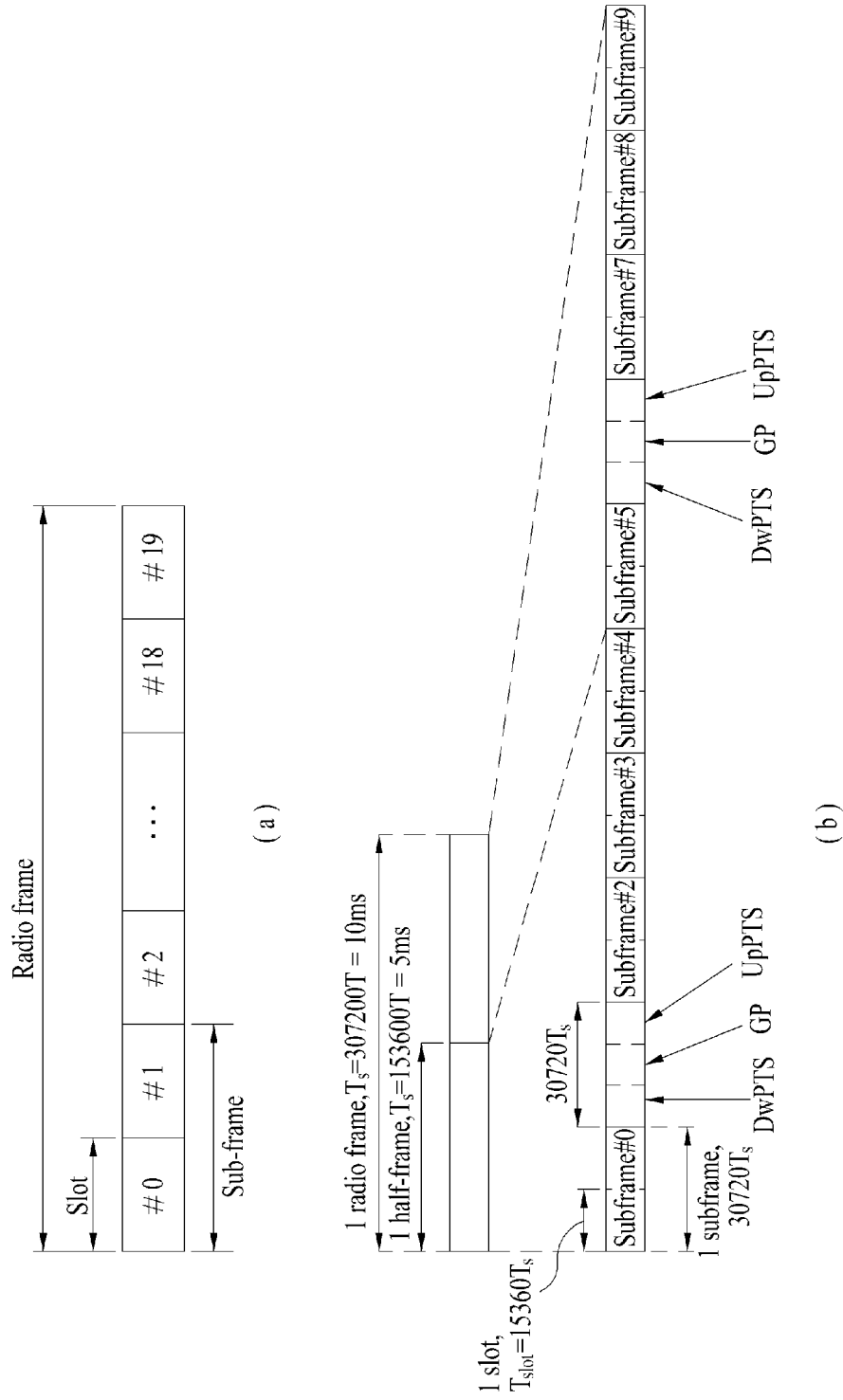
FIG. 2 illustrates a diagram for one example of a structure of a radio frame.

FIG. 2 shows one example of a structure of a radio frames. In a cellular OFDM radio packet communication system, UL/DL (uplink/downlink) data packet transmission is performed by a unit of subframe. And, one subframe is defined as a predetermined time interval including a plurality of OFDM symbols. In the 3GPP LTE standard, a type-1 radio frame structure applicable to FDD (frequency division duplex) and a type-2 radio frame structure applicable to TDD (time division duplex) are supported.

FIG. 2 (a) illustrates a diagram for a structure of a downlink radio frame of type 1. A DL (downlink) radio frame includes 10 subframes. Each of the subframes includes 2 slots. And, a time taken to transmit one subframe is defined as a transmission time interval (hereinafter abbreviated TTI). For instance, one subframe may have a length of 1 ms and one slot may have a length of 0.5 ms.

FIG. 2 (b) illustrates a diagram for a structure of a downlink radio frame of type 2. A type-2 radio frame includes 2 half frames. Each of the half frames includes 5 subframes, DwPTS (downlink pilot time slot), GP (guard period) and UpPTS (uplink pilot time slot). And, one of the subframes includes 2 slots. The DwPTS is a time interval reserved for a DL transmission. And, the UpPTS is a time interval reserved for a UL transmission. The guard period is a period for eliminating interference generated in uplink due to multi-path delay of a downlink signal between uplink and downlink.

The above-described structures of the radio frame are exemplary only. And, the number of subframes included in a radio frame, the number of slots included in the subframe and the number of symbols included in the slot may be modified in various ways.

Figure 3:
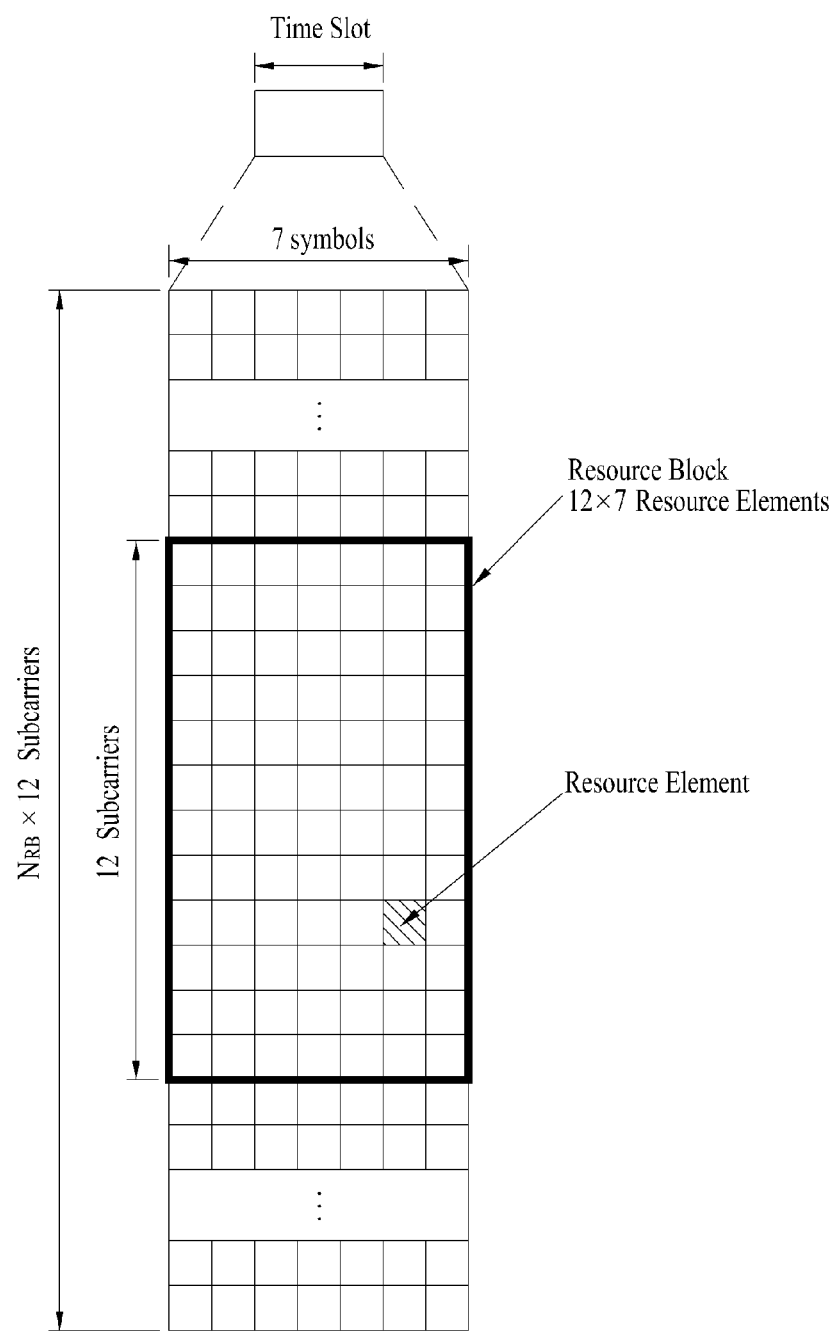
FIG. 3 illustrates a diagram for one example of a resource grid of a downlink slot.

FIG. 3 shows one example of a resource grid of a downlink slot.

Referring to FIG. 3, one slot includes a plurality of OFDM symbols in a time domain and a multitude of resource blocks (RBs) in a frequency domain. In 3GPP LTE system, since OFDM is used in DL, OFDM symbol indicates one symbol duration. The OFDM symbol may be called SC-FDMA symbol or symbol duration. A resource block (RB) by resource allocation unit may include a plurality of contiguous subcarriers in one slot. The resource block can include 12 subcarriers in frequency domain. Each element on a resource grid may be called a resource element (RE). One RB includes 12×7 or 12×6 REs. The number NRB of RBs included in the DL slot depends on a DL transmission band. A structure of a UL slot is identical to that of the DL slot but OFDM symbol is replaced by SC-FDMA symbol.

The number of OFDM symbols included in one slot may vary depending on a configuration of CP (cyclic prefix). The CP can be categorized into an extended CP or a normal CP. For instance, in case that OFDM symbol is configured by the normal CP, the number of OFDM symbols included in one slot may amount to 7. In case that OFDM symbol is configured by the extended CP, since a length is incremented by one OFDM symbol, the number of OFDM symbols included in one slot is smaller than that of the normal CP case. For instance, in case of the extended CP, the number of OFDM symbols included in one slot may amount to 6. In case that a channel state is unstable (e.g., a case that a user equipment moves at high speed, etc.), the extended CP can be used to further reduce inter-symbol interference.

In case of using the normal CP, since one slot includes 7 OFDM symbols, one subframe includes 14 OFDM symbols. The first maximum 3 OFDM symbols are assigned to PDCCH (physical downlink control channel) and the rest of the OFDM symbols may be assigned to PDSCH (physical downlink shared channel).

Figure 4:
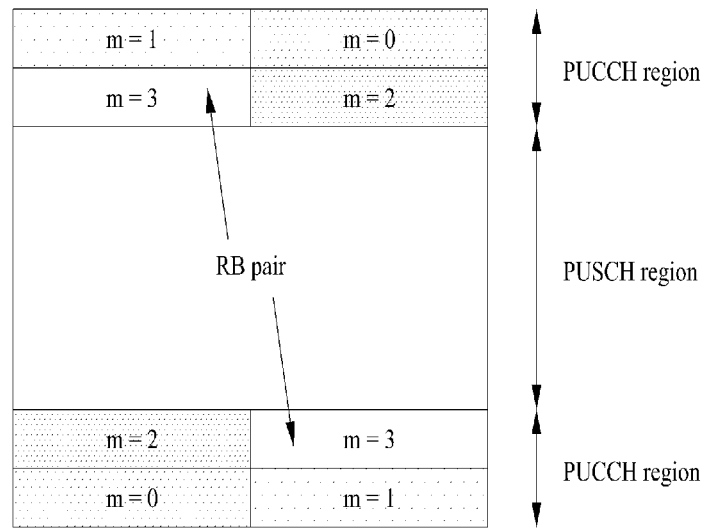
FIG. 4 illustrates a diagram for one example of a structure of an uplink subframe.

FIG. 4 shows one example of a structure of an uplink subframe.

Referring to FIG. 4, a UL (uplink) subframe may include a plurality of slots (e.g., 2 slots). Each of the slots may include a different number of SC-FDMA symbols depending on a length of a cyclic prefix. For instance, in case of a normal cyclic prefix, a slot may include 7 SC-FDMA symbols. The UL subframe may be divided into a control region and a data region. The data region includes PUSCH and is used to transmit such a data signal as audio and the like. The control region includes PUCCH and is used to transmit UCI. The PUCCH includes an RB pair (e.g., m=0, 1, 2, 3) (e.g., RB pair at frequency mirrored position) located at both ends of the data region on a frequency axis and hopping on a slot boundary.

Table 1 shows transmission CSI type, PUCCH reporting modes and the like per PUCCH format.

TABLE 1

| PUCCH Format | Reported | Mode State | PUCCH Reporting Modes | | | |
|---|---|---|---|---|---|---|
| | | | Mode 1-1 (bits/BP) | Mode 2-1 (bits/BP) | Mode 1-0 (bits/BP) | Mode 2-0 (bits/BP) |
| 1 | Sub-band CQI | RI = 1 | NA | 4 + L | NA | 4 + L |
| | | RI > 1 | NA | 7 + L | NA | 4 + L |
| 1a | Sub-band CQI/second PMI | 8 antenna ports RI = 1 | NA | 8 + L | NA | NA |
| | | 8 antenna ports 1 < RI < 5 | NA | 9 + L | NA | NA |
| | | 8 antenna ports RI > 4 | NA | 7 + L | NA | NA |
| 2 | Wideband CQI/PMI | 2 antenna ports RI = 1 | 6 | 6 | NA | NA |
| | | 4 antenna ports RI = 1 | 8 | 8 | NA | NA |
| | | 2 antenna ports RI > 1 | 8 | 8 | NA | NA |
| | | 4 antenna ports RI > 1 | 11 | 11 | NA | NA |
| 2a | Wideband first PMI | 8 antenna ports RI < 3 | NA | 4 | NA | NA |
| | | 8 antenna ports 2 < RI < 8 | NA | 2 | NA | NA |
| | | 8 antenna ports RI = 8 | NA | 0 | NA | NA |
| 2b | Wideband CQI/second PMI | 8 antenna ports RI = 1 | 8 | 8 | NA | NA |
| | | 8 antenna ports 1 < RI < 4 | 11 | 11 | NA | NA |
| | | 8 antenna ports RI = 4 | 10 | 10 | NA | NA |
| | | 8 antenna ports RI > 4 | 7 | 7 | NA | NA |

TABLE 1-continued

| PUCCH Format | Reported | Mode State | PUCCH Reporting Modes | | | |
|---|---|---|---|---|---|---|
| | | | Mode 1-1 (bits/BP) | Mode 2-1 (bits/BP) | Mode 1-0 (bits/BP) | Mode 2-0 (bits/BP) |
| 2c | Wideband CQI/first PMI/second PMI | 8 antenna ports RI = 1 | 8 | — | NA | NA |
| | | 8 antenna ports 1 < RI 4 | 11 | — | NA | NA |
| | | 8 antenna ports 4 < RI 7 | 9 | — | NA | NA |
| 3 | RI | 8 antenna ports RI = 8 | 7 | — | NA | NA |
| | | 2-layer spatial multiplexing | 1 | 1 | 1 | 1 |
| | | 4-layer spatial multiplexing | 2 | 2 | 2 | 2 |
| | | 8-layer spatial multiplexing | 3 | 3 | NA | NA |
| 4 | Wideband | RI = 1 or RI > 1 | NA | NA | 4 | 4 |
| 5 | RI/first PMI | 8 antenna ports, 2-layer spatial multiplexing | 4 | NA | NA | NA |
| | | 8 antenna ports, 4 and 8-layer spatial multiplexing | 5 | | | |
| 6 | RI/PTI | 8 antenna ports, 2-layer spatial multiplexing | NA | 2 | NA | NA |
| | | 8 antenna ports, 4-layer spatial multiplexing | NA | 3 | NA | NA |
| | | 8-antenna ports, 8-layer spatial multiplexing | NA | 4 | NA | NA |

In UCI format of PUCCH in LTE system, a periodic CSI reporting is transmitted through UCI format 2/2a/2b. Resource block allocation for PUCCH in slot $n_s$ can be expressed as Formula 1.

$$n_{PRB} = \begin{cases} \left\lfloor \frac{m}{2} \right\rfloor & \text{if } (m + n_s \bmod 2) \bmod 2 = 0 \\ N_{RB}^{UL} - 1 - \left\lfloor \frac{m}{2} \right\rfloor & \text{if } (m + n_s \bmod 2) \bmod 2 = 1 \end{cases} \quad \text{[Formula 1]}$$

In Formula 1, the m is determined in accordance with PUCCH format and UCI format 2 series become $m = \lfloor n_{PUCCH}^{(2\tilde{p})}/N_{sc}^{RB} \rfloor$. In this case, $n_{PUCCH}^{(2\tilde{p})}$ indicates a PUCCH resource size for an antenna port p and $N_{sc}^{RB}$ indicates the number of subcarriers belonging to one RB.

PUCCH resource is allocated by slot hopping. And, one m index is basically mapped to one PUCCH resource.

Figure 5:
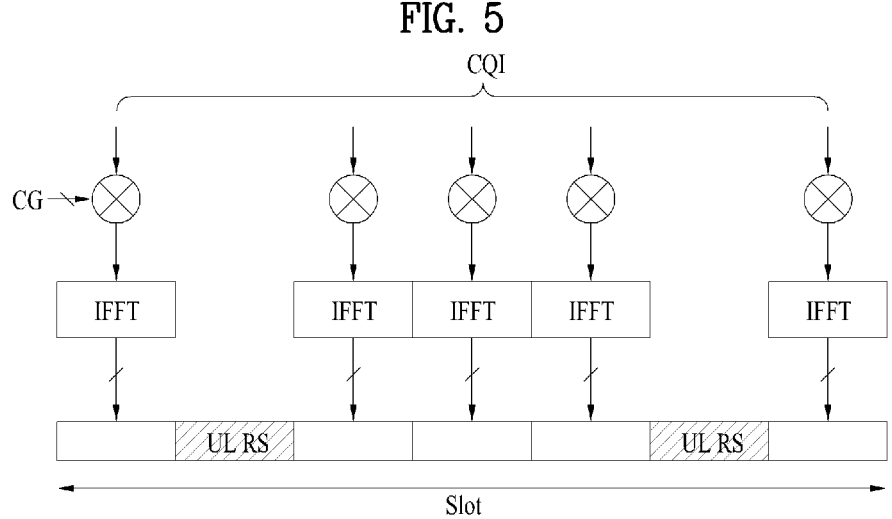
FIG. 5 and FIG. 6 illustrate diagrams for examples of slot level structures of PUCCH format 2/2a/2b.
Figure 6:
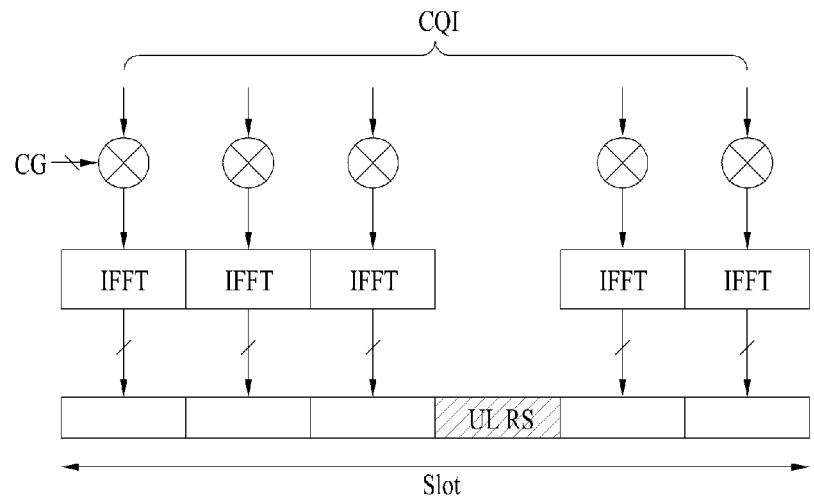

FIG. 5 shows PUCCH format 2/2a/2b in case of a normal cyclic prefix. And, FIG. 6 shows PUCCH format 2/2a/2b in case of an extended cyclic prefix. Referring to FIG. 5 and FIG. 6, in case of a normal CP, a subframe is constructed with 10 QPSK data symbols as well as RS symbol. Each QPSK symbol is spread in a frequency domain by CS and is then mapped to a corresponding SC-FDMA symbol. SC-FDMA symbol level CS hopping may be applied to randomize inter-cell interference. The RS may be multiplexed by CDM using a cyclic shift. For instance, if the number of available CSs is 12, 12 user equipments may be multiplexed in the same PRB. For another instance, if the number of available CSs is 6, 6 user equipments may be multiplexed in the same PRB.

CSI (e.g., CQI. PMI, RI, etc.) and combination of ACK/NACK with the CSI can be delivered through PUCCH format 2/2a/2b. And, Reed Muller (RM) channel coding may be applicable.

Channel coding for UL CSI in LTE system can be described as follows. First of all, bitstreams $a_0, a_1, a_2, a_3 \ldots a_{A-1}$ are channel-coded using (20, A) RM code. Table 2 shows a basic sequence for (20, A) code. The $a_0$ and the $a_{A-1}$ indicate MSB (most significant bit) and LSB (least significant bit), respectively. In case of an extended CP, maximum information bits amount to 11 bits except a case of simultaneously transmitting CSI and ACK/NACK. In case of simultaneously transmitting CSI and ACK/NACK, maximum information bits of CSI amount to 11 bits. When the transmission bits for ACK/NACK are 2 bits, information bits supported for block coding amount to maximum 13 bits. 13-bit block code is punctured and then transmitted as 20-bit codeword on PUCCH. This is called joint coding of CSI and ACK/NACK in case of the extended CP.

For instance, in case of a normal CP, 10 CSI information bits can generate 20 bits coded at ½ rate by Reed-Muller code.

After coding CSU into 20 bits using RM code, QPSK modulation can be applied. Before QPSK modulation, the coded bits can be scrambled.

TABLE 2

| I | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 0 | 1 | 0 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 0 | 0 | 1 | 1 | 0 | 1 | 1 | 1 | 1 |
| 8 | 1 | 1 | 0 | 1 | 1 | 0 | 0 | 1 | 1 | 0 | 1 | 1 | 1 |

TABLE 2-continued

| I | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 9  | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

Channel coding bits $b_0, b_1, b_2, b_3 \ldots b_{B-1}$ can be generated by Formula 2.

$$b_i = \sum_{n=0}^{A-1} (a_n \cdot M_{i,n}) \bmod 2 \quad \text{[Formula 2]}$$

In Formula 2, i=0, 1, 2 ... B−1.

Figure 7:
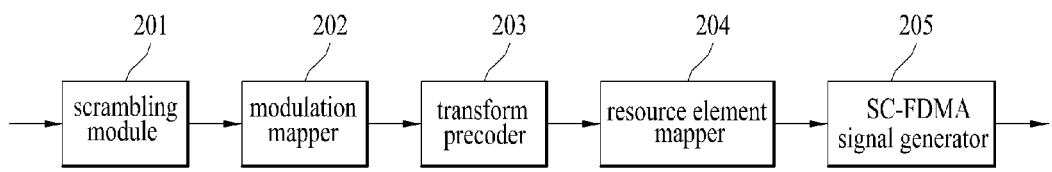
FIG. 7 illustrates a diagram for one example of an uplink signal processing method.

FIG. 7 is a diagram for describing a signal processing method for a user equipment to transmit an uplink (UL) signal.

Referring to FIG. 7, a scrambling module 201 can scramble a transmission signal using a UE-specific scrambling signal. This scrambled signal is inputted to a modulating mapper 202 and then modulated into a complex symbol by BPSK (binary phase shift keying), QPSK (quadrature phase shift keying) or 16/64 QAM (quadrature amplitude modulation) in accordance with a type and/or channel state of the transmission signal. Subsequently, the complex symbol is processed by a transform precoder 203 and then inputted to a resource element mapper 204. In this case, the resource element mapper 204 can map the complex symbol into a time-frequency resource element. This processed signal is inputted to an SC-FDMA signal generator 205 and may be then transmitted to a base station via antenna.

Figures 8, 9:
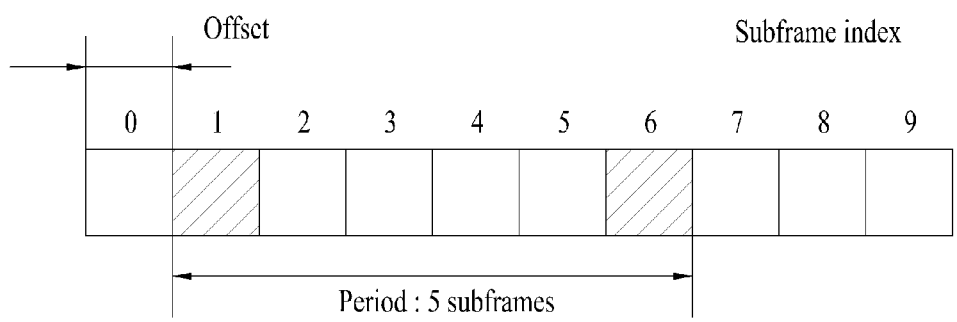
FIG. 8 and FIG. 9 illustrate diagrams for a periodic reporting of channel state information.

FIG. 8 and FIG. 9 illustrate diagrams for a periodic reporting of channel state information.

Referring to FIG. 8, 4 kinds of CQI reporting modes exist in LTE system. In particular, the CQI reporting mode is categorized into a wideband (EB) CQI or a subband (SB) CQI depending on a CQI feedback type. And, the CQI reporting mode can be categorized into a No PMI or a single PMI depending on a presence or non-presence of a PMI transmission. Each user equipment receives a transmission of information including a combination of period and offset through RRC signaling in order to report CQI periodically.

FIG. 9 shows one example of transmitting a channel state information if a user equipment receives signaling of an information indicating {period '5', offset '1'}. Referring to FIG. 9, in case of receiving an information indicating that period and offset are 5 and 1, respectively, a user equipment transmits a channel state information in an increasing direction of a subframe index by starting with $0^{th}$ subframe. Hence, referring to FIG. 9, a channel state information is transmitted by period of 5 subframes in a manner of leaving an offset of one subframe. The channel state information is basically transmitted on PUCCH. Yet, if PUSCH for a data transmission exists at the same timing point, the channel state information is transmitted on PUSCH together with PUSCH.

Figure 10:
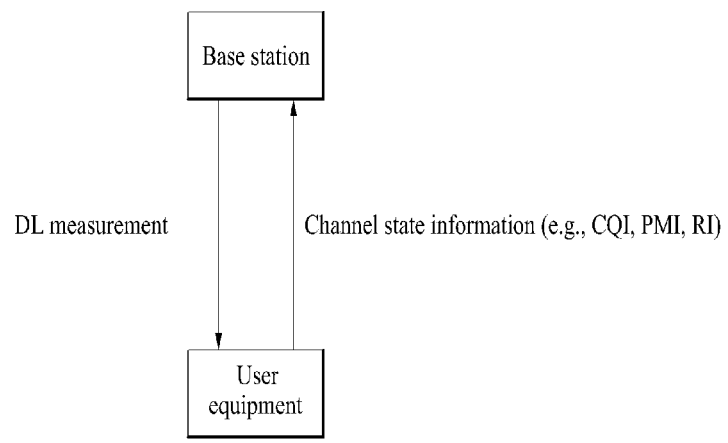
FIG. 10 illustrates a diagram of concept for one example of channel state information generation and transmission.

FIG. 10 is a diagram of concept for one example of channel state information generation and transmission.

Referring to FIG. 10, a user equipment measures a DL quality using a reference signal and reports a channel state information to a base station. Subsequently, the base station performs a DL scheduling (e.g., UE selection, resource allocation, etc.) in accordance with the reported channels state information. In this case, the channel state information includes at least one of CQI, PMI and RI. The CQI can be generated in various ways. For instance, for the CQI, a channel state (or a spectrum efficiency) is quantized and then indicated, SINR (signal to interference noise ratio) is calculated and then indicated, or a state in which a channel is actually applied is indicated like MCS (modulation coding scheme).

In an existing LTE system, a common RS (CRS) is used for channel measurement. The CRS is used for both channel information acquisition and data demodulation and transmitted in each subframe. Meanwhile, in LTE-A, CSI-RS (e.g., channel state information RS, channel state indication RS, etc.) may be usable for the purpose of channel measurement only. The CSI-RS is intermittently transmitted on a time axis to reduce overhead. For instance, the CSI-RS can be transmitted periodically with period amounting to an integer multiple of a subframe or in accordance with a specific pattern. The CSI-RS transmitted period or pattern can be set up by a base station.

CQI reporting configuration information may be used in a manner shown in Table 3.

TABLE 3

CQI-ReportConfig ::= SEQUENCE { cqi-ReportModeAperiodic ENUMERATED {
rm12, rm20, rm22, rm30, rm31, spare3, spare2, spare1} OPTIONAL, -- Need OR
nomPDSCH-RS-EPRE-Offset INTEGER (−1..6), cqi-ReportPeriodic
CQI-ReportPeriodic OPTIONAL -- Need ON} CQI-ReportConfig-v920 ::=
SEQUENCE { cqi-Mask-r9 ENUMERATED {setup} OPTIONAL, -- Cond cqi-Setup
pmi-RI-Report-r9 ENUMERATED {setup} OPTIONAL -- Cond PMIRI}
CQI-ReportConfig-r10 ::= SEQUENCE { cqi-ReportModeAperiodic-r10
ENUMERATED { rm12, rm20, rm22, rm30, rm31, spare3, spare2, spare1}
OPTIONAL, -- Need OR nomPDSCH-RS-EPRE-Offset-r10 INTEGER (−1..6), TABLE 3-continued cqi-ReportPeriodic-r10 CQI-ReportPeriodic-r10 OPTIONAL, -- Need ON
aperiodicCSI-Trigger-r10 SEQUENCE { trigger1-r10 BIT STRING (SIZE (8)),
trigger2-r10 BIT STRING (SIZE (8)) } OPTIONAL, -- Need ON pmi-RI-Report-r9
ENUMERATED {setup} OPTIONAL, -- Cond PMIRI
csi-SubframePatternConfig-r10 CHOICE { release NULL, setup SEQUENCE {
csi-SubframePattern-r10 SEQUENCE { csi-SubframeSet1-r10
MeasSubframePattern-r10, csi-SubframeSet2-r10 MeasSubframePattern-r10 },
cqi-ReportPeriodicIndex-r10 SEQUENCE { cqi-pmi-ConfigIndex2-r10 INTEGER
(0..1023), ri-ConfigIndex2-r10 INTEGER (0..1023) OPTIONAL -- Need OR }
OPTIONAL -- Cond Periodic } } OPTIONAL -- Need ON}
CQI-ReportConfigSCell-r10 ::= SEQUENCE { cqi-ReportModeAperiodic-r10
ENUMERATED { rm12, rm20, rm22, rm30, rm31,* spare3, spare2, spare1}
OPTIONAL, -- Need OR nomPDSCH-RS-EPRE-Offset-r10 INTEGER (-1..6),
cqi-ReportPeriodicSCell-r10 CQI-ReportPeriodic-r10 OPTIONAL, -- Need ON
pmi-RI-Report-r9 ENUMERATED {setup} OPTIONAL -- Cond PMIRI}
CQI-ReportPeriodic ::= CHOICE { release NULL, setup SEQUENCE {
cqi-PUCCH-ResourceIndex INTEGER (0..1185), cqi-pmi-ConfigIndex INTEGER
(0..1023), cqi-FormatIndicatorPeriodic CHOICE { widebandCQI NULL, subbandCQI
SEQUENCE { k INTEGER (1..4) } }, ri-ConfigIndex INTEGER (0..1023)
OPTIONAL, -- Need OR simultaneousAckNackAndCQI BOOLEAN }}
CQI-ReportPeriodic-r10 ::= CHOICE { release NULL, setup SEQUENCE {
cqi-PUCCH-ResourceIndex-r10 INTEGER (0..1184),
cqi-PUCCH-ResourceIndexP1-r10 INTEGER (0..1184) OPTIONAL, -- Need OR
cqi-pmi-ConfigIndex-r10 INTEGER (0..1023), cqi-FormatIndicatorPeriodic-r10
CHOICE { widebandCQI-r10 SEQUENCE { csi-ReportMode-r10 ENUMERATED
{submode1, submode2} OPTIONAL -- Need OR }, subbandCQI-r10 SEQUENCE {
k-r10 INTEGER (1..4), periodicityFactor-r10 ENUMERATED {n2, n4} } },
ri-ConfigIndex-r10 INTEGER (0..1023) OPTIONAL, -- Need OR
simultaneousAckNackAndCQI-r10 BOOLEAN, cqi-Mask-r9 ENUMERATED
{setup} OPTIONAL -- Need OR }}

The CSI (e.g., CQI. PMI, RI, etc.) reporting of an existing LTE can be categorized into a periodic reporting or an aperiodic reporting.

The periodic CSI reporting means that a user equipment reports a channel quality at a determined timing point without separate signaling. In a single carrier situation, since CSI configuration information (e.g., CSI reporting period, subframe offset for CSI reporting, etc.) for the periodic CSI reporting is set for each CSI information (e.g., CQI. PMI, RI, etc.), transmission timings of different CSI informations may collide with each other in the same subframe. In this case, in order to handle the collision situation, a transmission of a specific CSI information can be dropped in the CSI collision occurring subframe or a transmission of a CSI information having a short CSI reporting period can be dropped, in accordance with significance (e.g., RI>CQI, PMI; wideband CSI>subband CSI) of CSI information.

On the other hand, the aperiodic CSI reporting means that a network requires explicit signaling if necessary.

Figure 11:
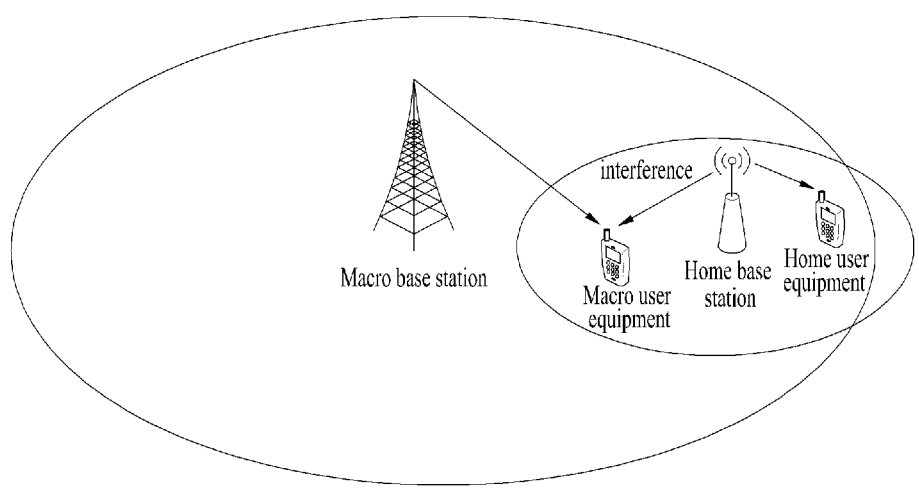
FIG. 11 illustrates a diagram for one example of a heterogeneous network including a macro cell and a micro cell.

FIG. 11 is a diagram for one example of a heterogeneous network including a macro cell and a micro cell. In the next generation communication standards of LTE-A and the like, ongoing discussions are made on a heterogeneous network in which a micro cell with low transmission power exists within an existing macro cell coverage in a manner of overlapping.

Referring to FIG. 11, a macro cell may overlap with at least one micro cell. A service of the macro cell is provided by a macro eNodeB (MeNB). In the present specification, a macro cell and a macro eNodeB can be used interchangeably. A user equipment (UE) connected to a macro cell can be called a macro user equipment (macro UE). The macro user equipment receives a DL signal from a macro eNodeB and transmits a UL signal to the macro eNodeB.

A micro cell can be called a femto cell or a pico cell. A service of the micro cell is provided by a pico eNodeB, a home eNodeB (HeNB), a relay node (RN) or the like. For clarity, the pico eNodeB, the home eNodeB (HeNB) or the relay node (RN) shall be named a home eNodeB (HeNB) in general. In this case, the micro cell and the home eNodeB may be interchangeably usable. A user equipment connected to a micro cell can be called a micro user equipment or a home user equipment (home-UE). The home user equipment receives a downlink signal from a home eNodeB and transmits a UL signal to the home eNodeB.

Micro cell can be classified into an OA (open access) cell or a CSG (closed subscriber group) cell depending on accessibility. The OA cell means a micro cell from which a user equipment can receive a service at any time without a separate access restriction, when necessary. On the contrary, the CSG cell means a micro cell from which a granted specific user equipment can receive a service.

In a heterogeneous network, since a macro cell and a micro cell overlap with each other, inter-cell interference becomes a serious problem. When a macro user equipment is located on a boundary between a macro cell and a micro cell, as shown in FIG. 11, a DL signal of a home eNodeB works as interference on the macro user equipment. Similarly, a DL signal of the macro eNodeB may work as interference on a home user equipment within the micro cell. Moreover, a UL signal of the macro user equipment may work as interference on the home eNodeB. Similarly, a UL signal of the home user equipment may work as interference on the macro eNodeB.

As mentioned in the foregoing description, in case of a macro-pico heterogeneous network, a macro cell may cause strong interference to a user equipment of a pico cell, and more particularly, to a pico user equipment on a cell boundary. Hence, a method of cancelling UL/DL interference on data, an L1/L2 control signal, a sync signal or a reference signal is required. An inter-cell interference cancellation (ICIC) scheme can be handled in time, frequency and/or space domain.

Figure 12:
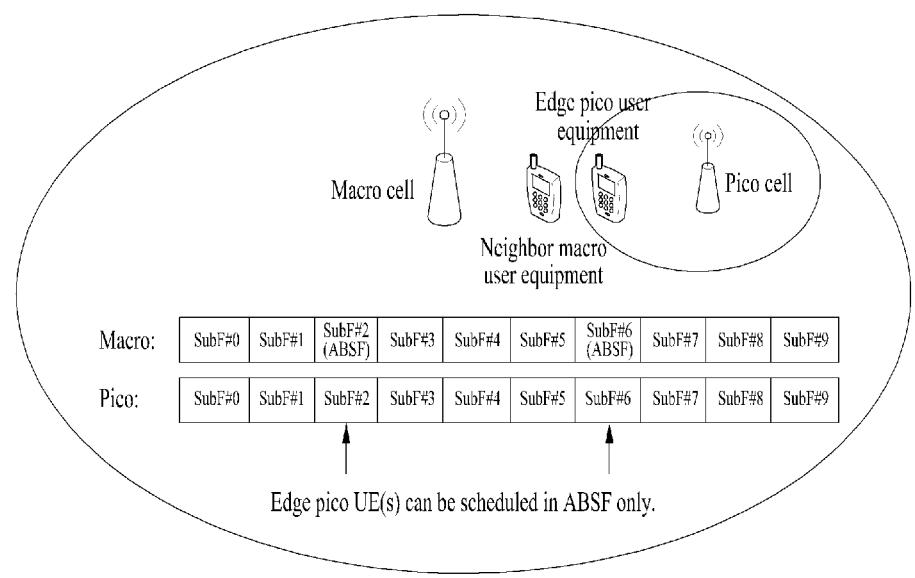
FIG. 12 illustrates a diagram for one example of a scheme of cancelling inter-cell interference in a heterogeneous network.

FIG. 12 is a diagram for one example of a scheme of cancelling inter-cell interference in a heterogeneous network. For clarity, a target to be protected from inter-cell interference is a pico user equipment. In this case, an interference triggering aggressor becomes a macro cell or a macro eNodeB. The present example shows a case of using a time-domain interference cancellation scheme in an aggressor cell.

Referring to FIG. 12, an inter-cell interference triggering macro cell can assign ABS (almost blank subframe) (or ABSF) in a radio frame. The ABS indicates a subframe (SubF) set not to transmit a normal DL signal except a specific DL signal (or, a DL signal transmission/power restricted subframe, a DL interference restricted subframe). The ABS can be repeated to have a predetermined pattern in at least one radio frame (e.g., 4 radio frames). The present example shows a case that the ABS is set in subframe #2/#6.

The macro cell informs a pico cell of ABS configuration (e.g., 40-bit bitmap) through a backhaul link. The pico cell is then able to schedule a pico user equipment using the ABS configuration. For instance, a (cell-edge) pico user equipment can be scheduled during the ABS interval only. In particular, as the pico user equipment is scheduled in a pico subframe amounting to the same time of the ABS, it can receive a small-interference signal from the pico cell. Hence, a user equipment (i.e., a pico user equipment) of a victim cell, and more particularly, a cell-edge user equipment should report a CSI for a subframe less affected by interference for efficient scheduling. Yet, if allocation in an interference-affected subframe deviating from an interference-mitigating subframe is inevitable due to a number of cell-edge user equipments or an efficient scheduling needs to be performed, a corresponding user equipment should be able to make a CSI report of interference-affected subframes.

A set consisting of subframes less affected by interference and a set consisting of interference-affected subframes are called a restricted subsets. Namely, the restricted subset indicates a subframe set in which channel measurement is allowed for the corresponding CSI reporting. Two restricted subsets are provided through RRC signaling. The restricted subset including the set consisting of the subframes less affected by interference and the set consisting of the interference-affected subframes includes ($C_{CSI,0}$) and ($C_{CSI,1}$).

Figure 13:
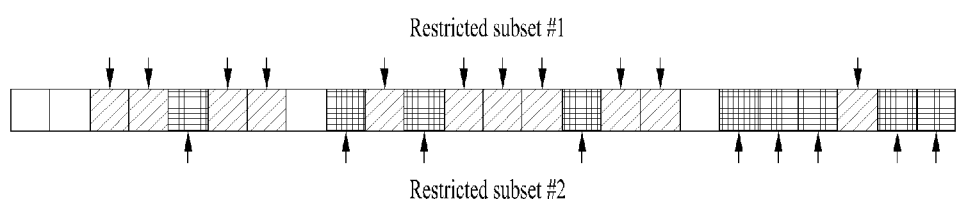
FIG. 13 illustrates a diagram for one example of a configuration of a restricted subset in a single carrier situation.

FIG. 13 is a diagram for one example of a configuration of a restricted subset in a single carrier situation. In the drawing, each box indicates a subframe.

Referring to FIG. 13, a plurality of restricted subsets (e.g., a restricted subset #1 and a restricted subset #2) are independently configured in one or a plurality of radio frames. Each of the restricted subsets can be configured by upper layer (e.g., RRC) signaling and a detailed pattern can be indicated using a bitmap. For instance, a location of a bit in a bitmap corresponds to a corresponding subframe in a period for the restricted subset setup. If a bit value is set to 1, a channel measurement is allowed in the corresponding subframe. If a bit value is set to 0, a channel measurement may be prohibited in the corresponding subframe. A period of a restricted subset pattern can be set equal to that (e.g., 40 ms, 4 radio frames, etc.) of an ABS pattern. One of the restricted subset #1 and the restricted subset #2 may match the ABS pattern but can be operated in a mismatched manner. Similarly, the other one of the restricted subset #1 and the restricted subset #2 may match a non-ABS pattern but can be operated in a mismatched manner. The restricted subset #1 and the restricted subset #2 can be configured in a manner of not overlapping each other in a prescribed subframe. Moreover, a sum of the restricted subset #1 and the restricted subset #2 may amount to a portion of a whole subframe.

In the case shown in FIG. 13, a user equipment separately performs periodic/aperiodic CSI reporting for the restricted subset #1/#2. In case of the periodic CSI reporting, a periodic CSI configuration (e.g., a CSI reporting period, a subframe offset for a CSI reporting, etc.) can be set for each of the restricted subsets. The CSI reporting period/offset can be set for each CSI information (e.g., CQI, PMI, RI, etc.) in one restricted subset.

Currently, in most of the systems including 3GPP LTE-A, although CSI (channel state information) reflects a channel quality variation in a frequency region, assume that a channel quality in a time region is constant in a predetermined interval. As mentioned in the foregoing description, in most of the current systems, a specific reporting interval is provided in a time region in consideration of UE mobility only but a same subframe configuration is assumed between cells. Although a channel state per subframe may be time-variable due to a difference in resource allocation for a user equipment per cell, the channel state may be regarded as constant in aspect of entire cells. Hence, even if a reporting interval (e.g., an interval in which CSI property is identical or similar in a specific time region) for UE mobility is determined for each CSI and one information per CSI is fed back based on the determined reporting interval, system performance is not affected significantly. Generally, CSI (channel state information) is measured or reported by unit of whole band or subband by reflecting channel selectivity in a frequency region. Yet, a same value in a specific period is assumed and reported in consideration of time domain correlation for UE mobility only in a time region. Only if the assumption that a measured channel state in a determined reporting period is static is established, system performance can be secured.

Yet, inter-cell interference can be variously changed in the measurement and reporting period for each CSI in a specific environment (or system). As an inter-cell frame (or subframe) configuration or structure is different, if time variation of the inter-cell interference occurs, the assumption that the CSI property is identical or similar may not be established. In LTE-A Release 10 system, when a resource is allocated with a different muted resource for each macro eNB, e.g., ABS (almost blank subframe) configuration, inter-cell interference received by a macro UE as well as by a pico UE varies on a subframe level in a time region (subframe-wise).

For another instance, it is intended to introduce a formation of an asymmetric TDD subframe configuration that enables a subframe configuration of current LTE-A TDD to have a different configuration for each cell. In this case, a collision between a downlink subframe and an uplink subframe may occur.

Thus, a prescribed downlink subframe may receive inter-cell interference from a downlink subframe of another cell. And, a prescribed downlink subframe may receive inter-cell interference from an uplink subframe of another cell. Hence, a property for CSI measured by a specific user equipment may vary in each subframe overall.

A base station (eNB) controls a time/frequency resource for a user equipment to report CSI (i.e., CQI (channel quality indicator), PTI (precoding type indicator), PMI (precoding matrix indicator), RI (rank indicator), etc.). For instance, a user equipment in transmission mode 8 or transmission mode 9 feeds back PMI/RI by a parameter pmi-RI-Report transmitted from an upper layer.

If the upper layer informs the user equipment of a subframe set ($C_{CSI,0}$) and ($C_{CSI,1}$), the user equipment measures CSI using a resource-restricted CSI measurement.

A protection subframe type and a non-protection subframe type can coexist as a set consisting of subframes less affected by interference and a restricted subset consisting of subframes affected by interference. And, CSI varies depending on a case that inter-cell interference according to subframe sets ($C_{CSI,0}$) and ($C_{CSI,1}$) is measured in which subframe. In this case, since the CSI fluctuates in accordance with time, it is not clear that the CSI is measured in which subframe and that a scheduling will be performed with reference to which subframe. Hence, as an error between a measured CSI and an actually applied CSI increase, overall system performance may be lowered. This can directly result in system performance degradation. Although a base station (eNB) can command an additional CSI reporting by triggering aperiodic CSI reporting, it shows strong event-driven property and requires an additional signaling disadvantageously.

If a subframe configuration keeps varying between base stations or cells, a CSI measured in each subframe is affected by interference between different cells to lose reliability at a timing of reporting and applying the measured CSI. Hence, system performance may be degraded.

Therefore, according to the present invention, proposed is a method of enhancing overall system performance by feeding back CSI in a manner of reflecting time-varying inter-cell interference and channel quality variation.

In particular, according to the present invention, proposed is a method of feeding back at least one CSI information for a periodic CSI reporting. A user equipment can report a plurality of CSIs for a CSI reporting period per CSI received from a base station. In particular, the present invention proposes to adaptively cop with a channel environment by transmitting CSIs for ($C_{CSI,0}$) and ($C_{CSI,1}$) all. There is a scheme of transmitting a plurality of CSIs for ($C_{CSI,0}$) and ($C_{CSI,1}$) on at least one PUCCH or a scheme of transmitting a plurality of CSIs for at least one different subframe on one PUCCH.

In a $1^{st}$ method according to the present invention, a user equipment transmits CSI to a base station on at least one PUCCH. LTE-A currently provides ($C_{CSI,0}$) and ($C_{CSI,1}$) which are two CSI measurement subframe sets. Yet, regarding a reporting, a single CSI reporting is supported only and a base station is allowed to make a corresponding determination. In case that a plurality of restricted subsets are configured, since a periodic CSI configuration is set for each of the restricted subsets, the periodic CSI reportings of the same kind may collide with each other at the same timing point. In case that a plurality of CSI reportings collide with each other in the same subframe, according to the related art, a CSI of a highest priority is selected and another is dropped. In this case, for instance, since a single CSI measured in each 40 subframes is reported only, it may not be able to sufficiently cope with a time-varying channel environment due to inter-cell interference. Therefore, according to the present invention, it is able to sufficiently cope with a channel time-variation in a reporting period per CSI by assigning at least one or more PUCCHs to each user equipment. If FIG. 4 and Formula 2 are applied to the present invention, a base station transmits information on at least one m according to format to a user equipment on PUCCH. If a subframe configuration between base stations or cells keeps changing, a CSI measured in each subframe is affected by interference between different cells. Hence, the user equipment reports a plurality of CSIs for a plurality of restricted subsets, which are measured for the restricted subsets, respectively, to the base station. The base station receives a plurality of the CSIs for a plurality of the restricted subsets reflecting interference varying in each subframe from the user equipment and then uses the received CSIs, thereby making a selection to enable a scheduling adaptively.

According to one embodiment, at least one of a parameter cqi-PUCCH-ResourceIndex and a parameter cqi-PUCCH-ResourceIndexP1 for at least one measurement subframe set is additionally included in CQI-ReportConfig transmitted to an upper layer.

According to another embodiment, since CSI reporting information can be re-calculated in consideration of inter-cell interference, a user equipment can additionally transmit information on PMI and/or RI to a base station. To this end, CQI-ReportConfig in Table 3 transmitted to an upper layer additionally includes at least one of parameters pmi-RI-Report, ri-ConfigIndex and ri-ConfigIndex2 for at least one measurement subframe set.

In case that PUCCH and PUSCH are simultaneously assigned, HARQ-ACK can be transmitted through UCI format 1/1a/1b and a periodic CSI can be transmitted on PUSCH. In this case, CQI information transmitted on PUSCH can be set to include at least one CQI information on at least one measurement subframe set for the at least one measurement subframe set as well. To this end, at least one of the following parameters betaOffset-CQI-Index, betaOffset-CQI-Index-MC, betaOffset-RI-Index and betaOffset-RI-Index-MC is set to be included in PUSCH-Config transmitted to an upper layer. The above-described $1^{st}$ method is advantageous in performing a channel estimation effectively and enabling system performance enhancement by reporting a plurality of CSIs for time-varying ICI (Inter-Cell Interference) and the like.

A $2^{nd}$ method according to the present invention proposes a scheme of reporting a plurality of CSIs for at least one or more subframes different from each other on a single PUCCH. In particular, according to the $2^{nd}$ method, in order to implement the same effects with the same existing resource overhead, a plurality of CSIs for at least one or more subframes different from each other are reported through a single PUCCH. Therefore, the $2^{nd}$ method is advantageous in that resource overhead is not increased by transmitting the single PUCCH.

Table 4 shows a modulation scheme per PUCCH format and the number of bits per subframe.

TABLE 4

| PUCCH format | Modulation scheme | Number of bits per subframe, |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |

Referring to Table 4, the format 2 series for transmitting CSI require resources of 20~22 bits. This results from adding information on HARQ-ACK to a result of performing linear coding on CSI of maximum 11 bits in accordance with each CSI reporting type by (20, A) (where 'A' is the input information bit number of CSI) in addition.

As mentioned in the foregoing description, Reed Muller (RM) channel coding is applicable to the present invention. For the channel coding for UL CSI in LTE system, a plurality of CSI coding schemes reported by a user equipment may include Joint Coding and Separate Coding.

According to Joint Coding, for a restricted CSI reporting type and mode, the information bits for the 'A' of (20, A) is configured by synthesizing a plurality of CSIs.

In case of transmitting a full version for at least two CSI informations, since an input bit size of linear coding becomes greater than an output bit size, Joint Coding may not be applicable. Hence, CSI for a plurality of CSI measurement sets is synthesized only for a CSI reporting type and a PUCCH reporting mode, which do not violate the corresponding condition, whereby bits can be met.

For instance, referring to Table 1, according to the CSI reporting type 2, the case of 2 antenna ports requires 6 bits in each of Mode 1-1 and Mode 2-1 bits for transmitting Wideband CQI/PMI. Hence, for 2 CSI measurement sets ($C_{CSI,0}$) and ($C_{CSI,1}$), CSI information bits are configured in a manner that a sum of the CSI information 6 bits for ($C_{CSI,0}$) and the CSI information 6 bits for ($C_{CSI,1}$) amounts to 12 bits and (20, 12) coding is performed thereon. On the other hand, referring to Table 1, the case of 4 antenna ports of CSI reporting mode 2 requires 11 bits in each of Mode 1-1 and Mode 2-1. Hence, for two CSI measurement sets ($C_{CSI,0}$) and ($C_{CSI,1}$), total 22 bits are required, which is not appropriate for applying (20, A) coding. As a condition for coding synthesis, as mentioned in the foregoing description, the 'A' generated from synthesizing a plurality of CSIs for (20, A) coding should be set to a value smaller than 11. Hence, for example, in case of performing coding using Table 2, if the information bits of the synthetic CSI generated from synthesizing a plurality of CSIs exceeds 11, one of two CSI is transmitted and the other is dropped, without applying the present invention.

According to another embodiment, for the case of CQI reporting only, CSI reporting information is configured in a manner of synthesizing a plurality of CQIs for a plurality of CSI measurement sets.

For example, the CSI reporting type 1 and/or the CSI reporting type 4 shown in Table 1 is limitedly applied.

According to Separate Coding, for a restricted CSI reporting type and mode, a plurality of CSIs for a plurality of CSI measurement sets are coded by (20, A) and then synthesized. Subsequently, a rate-matched 20-bit CSI information is generated.

For the restricted CSI reporting type and mode, a plurality of CSIs for a plurality of CSI measurement sets are coded by (B, A) and then synthesized. Subsequently, 20-bit CSI information is generated. In this case, 'B' and 'A' have the same values for CSI per subframe and 'B' is greater than 'A' (B>A). For example, 'B' in (B, A) is either 10 or 12. For instance, when 'A' is 5 bits, 10-bit code is generated by coding each of the CSIs. Subsequently, 20 bits can be generated by synthesizing the respectively coded CSI information 10 bits together. The coded CSI information 10 bits are concatenated to generate 20 bits. This is because a size for the PUCCH transmission is determined in advance for generating final bits as 20 bits.

Figure 14:
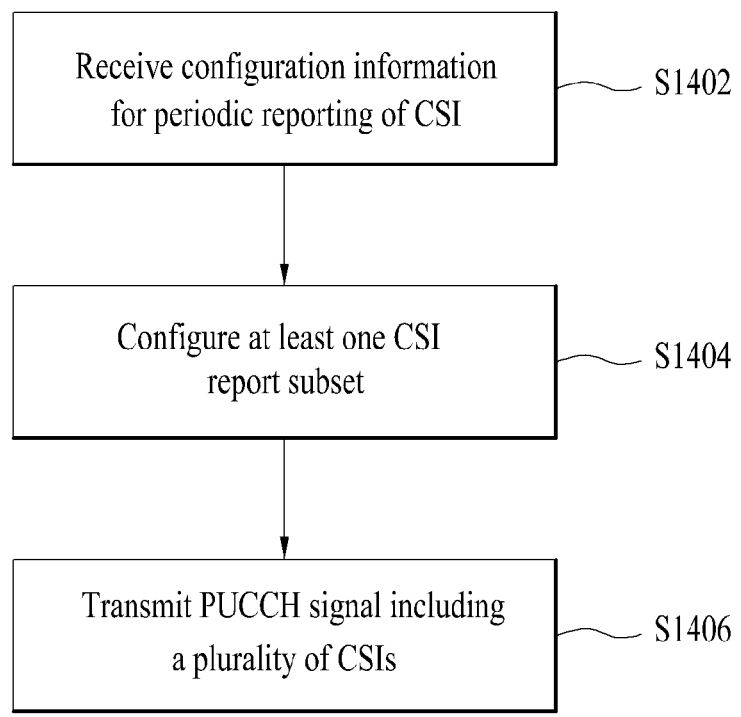
FIG. 14 illustrates a flowchart for a CSI reporting method according to one embodiment of the present invention.

FIG. 14 is a flowchart for a CSI reporting method according to one embodiment of the present invention.

Referring to FIG. 14, a base station transmits configuration information for a periodic reporting of CSI to a user equipment [S1402]. It is able to configure at least one CSI report subset through an upper layer (e.g., RRC) signaling [S1404]. CSI information on each of a plurality of CSI report sets according to the configuration information can be transmitted to the base station on PUCCH (physical uplink control channel) [S1406].

Figure 15:
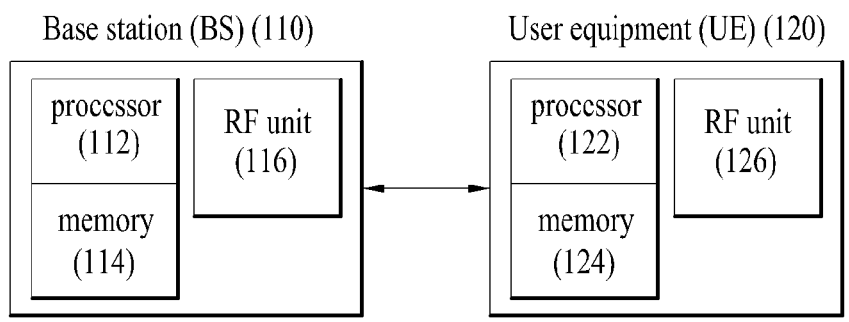
FIG. 15 illustrates a diagram for one example of a base station and user equipment applicable to the present invention.

In the above description, CSI is limited to CQI. Yet, the technical features of the present invention can be applied to PMI and RI. FIG. 15 shows one example of a base station and user equipment applicable to the present invention. If a relay node is included in a wireless communication system, a communication in backhaul link is performed between a base station and the relay node and a communication in access link is performed between the relay node and a user equipment. Therefore, the base station or user equipment shown in the drawing can be substituted with the relay node in some cases.

Referring to FIG. 15, a wireless communication system includes a base station BS 110 and a user equipment UE 120. The base station 110 includes a processor 112, a memory 114 and an RF (radio frequency) unit 116. The processor 112 can be configured to implement the procedures and/or methods proposed by the present invention. The processor 112 can control the radio frequency (RF) unit 116 to transmit a plurality of configuration informations for the periodic reporting of CSI to the user equipment. Moreover, the processor 112 controls the radio frequency unit 116 to receive CSI information on each of a plurality of CSI report sets according to the CSI configuration information from the user equipment on PUCCH (physical uplink control channel). The memory 114 is connected to the processor 112 and stores various kinds of informations related to operations of the processor 112. The RF unit 116 is connected to the processor 112 and transmits and/or receives radio or wireless signals. The user equipment 120 includes a processor 122, a memory 124 and an RF unit 126. The processor 122 can be configured to implement the procedures and/or methods proposed by the present invention. The processor 122 can control the radio frequency (RF) unit 126 to receive configuration information for the periodic reporting of CSI from the base station. Moreover, the processor 122 controls the radio frequency unit 116 to transmit CSI information on each of a plurality of CSI report sets according to the configuration information to the base station on PUCCH (physical uplink control channel). The memory 124 is connected to the processor 122 and stores various kinds of informations related to operations of the processor 122. The RF unit 126 is connected to the processor 122 and transmits and/or receives radio or wireless signals. The base station 110 and/or the user equipment 120 can have a single antenna or multiple antennas.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

In this disclosure, embodiments of the present invention are described centering on the data transmission/reception relations between a base station and a user equipment. In this disclosure, a specific operation explained as performed by a base station may be performed by an upper node of the base station in some cases. In particular, in a network constructed with a plurality of network nodes including a base station, it is apparent that various operations performed for communication with a user equipment may be performed by a base station or other networks except the base station. In this case, 'base station' can be replaced by such a terminology as a fixed station, a Node B, an eNode B (eNB), an access point and the like. And, 'terminal' may be replaced by such a terminology as a user equipment (UE), a user equipment (MS), a mobile subscriber station (MSS)' and the like.

Embodiments of the present invention may be implemented using various means. For instance, embodiments of the present invention may be implemented using hardware, firmware, software and/or any combinations thereof. In case of the implementation by hardware, one embodiment of the present invention may be implemented by one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be then drivable by a processor. The memory unit may be provided within or outside the processor to exchange data with the processor through the various means known to the public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Accordingly, the present invention is applicable to a terminal, a base station and other equipments of a wireless mobile communication system. In particular, the present invention is applicable to a method of transmitting uplink control information and apparatus therefor.

What is claimed is:

1. A method for reporting channel state information (CSI), at a user equipment in a wireless communication system, the method comprising:
   receiving, by the user equipment, configuration information for a periodic reporting of the CSI from a base station;
   generating, by the user equipment, a plurality of CSI bits for each of a plurality of CSI report sets according to the configuration information, the plurality of CSI report sets includes at least a first CSI report set and a second CSI report set;
   generating, by the user equipment, the CSI based on a sum of size of the plurality of CSI bits; and
   transmitting, by the user equipment, the CSI to the base station on an uplink subframe,
   wherein, when the sum of size of the plurality of CSI bits is greater than a specific value, the CSI is generated using only the first CSI report set among the plurality of CSI report sets, and the second CSI report set is excluded from generating the CSI,
   wherein, when the sum of size of the plurality of CSI bits is smaller than or equal to the specific value, the CSI is generated using all of the plurality of CSI report sets and a joint coding scheme is applied to the plurality of CSI bits of all of the plurality of CSI reports sets, and
   wherein each of the plurality of the CSI report sets include one or more different subframes between them.

2. The method according to claim 1, wherein the plurality of the CSI report sets comprise a restricted subset including subframes respectively having different inter-cell interferences.

3. A method for receiving channel state information (CSI), at a base station in a wireless communication system, the method comprising:
   transmitting, by a base station, a plurality of configuration informations for a periodic reporting of CSI to a user equipment; and
   receiving the CSI based on a plurality of CSI report sets according to the configuration information from the user equipment on an uplink subframe, the plurality of CSI report sets includes at least a first CSI report set and a second CSI report set,
   wherein the CSI is generated based on a sum of size of the plurality of CSI bits,
   wherein, when the sum of size of the plurality of CSI bits is greater than a specific value, the CSI is generated using only the first CSI report set among the plurality of CSI report sets, and the second CSI report set is excluded from generating the CSI,
   wherein, when the sum of size of the plurality of CSI bits is smaller than or equal to the specific value, the CSI is generated using all of the plurality of CSI report sets and a joint coding scheme is applied to the plurality of CSI bits of all of the plurality of CSI reports sets, and
   wherein each of the plurality of the CSI report sets include one or more different subframes.

4. The method according to claim 3, wherein the plurality of the CSI report sets comprise a restricted subset including subframes respectively having different inter-cell interferences.

5. A user equipment configured to perform channel state information (CSI) reporting in a wireless communication system, the user equipment comprising:
   a radio frequency (RF) unit;
   a memory; and
   a processor operatively connected to the memory,
   wherein the processor is configured to control the radio frequency unit to receive configuration information for a periodic reporting of the CSI from a base station, to generate a plurality of CSI bits for each of a plurality of CSI report sets according to the configuration information, the plurality of CSI bits including at least a first CSI report set and a second CSI report set, to generate the CSI based on based on a sum of size of the plurality of CSI bits and to control the radio frequency unit to transmit the CSI to the base station on an uplink subframe,
   wherein, when the sum of size of the plurality of CSI bits is greater than a specific value, the CSI is generated using only the first CSI report set among the plurality of CSI report sets, and the second CSI report set is excluded from generating the CSI,
   wherein, when the sum of size of the plurality of CSI bits is smaller than or equal to the specific value, the CSI is generated using all of the plurality of CSI report sets and a joint coding scheme is applied to the plurality of CSI bits of all of the plurality of CSI reports sets, and wherein each of the plurality of the CSI report sets include one or more different subframes between them.

6. The user equipment according to claim 5, wherein the plurality of the CSI report sets comprise a restricted subset including subframes respectively having different inter-cell interferences.

7. A base station configured to receive a channel state information (CSI) in a wireless communication system, the base station comprising:
a radio frequency (RF) unit;
a memory and
a processor operatively connected to the memory,
wherein the processor is configured to control the radio frequency unit to transmit a plurality of configuration informations for a periodic reporting of CSI including at least a first CSI report set and a second CSI report set to a user equipment, and to control the radio frequency unit to receive the CSI based on a plurality of CSI report sets according to configuration information from the user equipment on an uplink subframe,
wherein the CSI is generated based on a sum of size of the plurality of CSI bits,
wherein, when the sum of size of the plurality of CSI bits is greater than a specific value, the CSI is generated using only the first CSI report set among the plurality of CSI report sets, and the second CSI report set is excluded from generating the CSI,
wherein, when the sum of size of the plurality of CSI bits is smaller than or equal to the specific value, the CSI is generated using all of the plurality of CSI report sets and a joint coding scheme is applied to the plurality of CSI bits of all of the plurality of CSI reports sets, and
wherein each of the plurality of the CSI report sets include one or more different subframes between them.

8. The user equipment according to claim 7, wherein the plurality of the CSI report sets comprise a restricted subset including subframes respectively having different inter-cell interferences.

* * * * *